July 31, 1962 M. SCHWARTZ ET AL 3,046,836

STRIP FILM FOR PICTURE AND SOUND REPRODUCTION

Original Filed Jan. 27, 1956

*INVENTORS*
MORRIS SCHWARTZ
EDWARD K. KAPRELIAN
*BY* Hane and Nydick
ATTORNEYS

United States Patent Office 3,046,836 Patented July 31, 1962

3,046,836

STRIP FILM FOR PICTURE AND SOUND REPRODUCTION

Morris Schwartz, Plainville, Conn., and Edward K. Kaprelian, Red Bank, N.J., assignors to The Kalart Company, Inc., Plainville, Conn.

Original application Jan. 27, 1956, Ser. No. 561,891, now Patent No. 2,925,753, dated Feb. 23, 1960. Divided and this application Nov. 16, 1959, Ser. No. 853,059
5 Claims. (Cl. 88—28)

The present invention relates to strip film. The term "strip film" is applied to a strip of film of any desired length bearing several photographic picture areas in longitudinally spaced relationship. The photographs may be successively projected upon a viewing surface by means of a suitable projector while the film is standing still. The intermittent transport of the film through the projector may be effected manually or automatically. The subject matter of the individual photographs may or may not be related. As is evident, strip film constitutes in effect a plurality of still photographic transparencies on a common carrier.

The present application is a divisional application divided out of our co-pending application Serial No. 561,891 filed January 27, 1956 and issued as Patent 2,925,753 on February 23, 1960.

While a projected still photograph, as any picture, is to a certain extent self-explanatory, additional information or comment pertaining to the picture is often necessary, or at least helpful. This is not true only for still photographs of a promotional, scientific or educational nature but also for pictures of more personal interest. The enjoyment of viewing pictures and the useful information derived therefrom will often be greatly increased by an accompanying audible comment on the subject matter depicted on the pictures.

There are known various strip film projectors which are associated with a sound reproducing apparatus using records or tape. The intelligence reproduced by such apparatus is suitably correlated with the sequence in which the pictures are projected. However, arrangements of this kind as heretofore known are quite bulky. It takes considerable time and space to set up the projector and the sound reproducing apparatus for a presentation and there is always the danger of associating a strip film with the wrong sound record.

Accordingly, it is an object of the invention to provide a novel and improved arrangement in which picture areas and associated sound record areas are combined on a common carrier. Such an arrangement affords the advantage that the projecting and reproducing equipment can be structurally combined and that certain components can be used for the operation of both equipments. As a result, the apparatus required for projecting still pictures accompanied by sound becomes much less bulky and does not have to be specially set up for each presentation, but can be started in the same manner as a conventional sound projector. Another advantage afforded by the invention is that any possibility of mixing up pictures and pertaining sound records is precluded. A further advantages is that the picture-sound record combination according to the invention lends itself to production by typical mass production methods.

Broadly speaking, the invention resides in a strip of film on which pitcure areas in the form of photographic transparencies and sound record areas are alternately provided in longitudinally spaced relationship. Each picture area is associated with a sound record area and such associated with a sound record area and such associated pair constitutes a program. Any desired number of programs may be accommodated on a strip of film for successive presentation.

A more specific object of the invention is to provide a novel and improved strip film bearing photographically produced picture areas and sound record areas.

Another specific object of the invention is to provide the records in each sound record area in the form of parallel lines, equally spaced and of equal length.

Another object of the invention is to provide a strip film of the kind just referred to, in which the parallel record lines are slightly inclined so that the lines constitute parts of a continuous helical line when a section of the film bearing a record area is visualized as being brought into a cylindrical configuration with the record lines circumferentially oriented. This has the advantage that continues reproduction may be obtained from the parallel lines.

Still another object of the invention is to provide a novel and improved strip film of the kind above referred to, in which, between the picture area and the sound record area of one program, the picture and/or sound record area of another program or programs are interposed. This affords the advantage of giving more freedom in the design of the projecting and reproducing equipment and better utilizing the film.

A further object of the invention is to provide a novel and improved strip film of the kind above referred to, bearing indicia to facilitate the identification and selection of a desired program.

Still another object of the invention is to provide a strip film on which the sound record areas are in the form of spiral photographic recordings.

A still further object of the invention is to provide a novel and improved strip film on which the sound record areas are magnetically recorded.

Apparatus for projecting and reproducing from strip film as above referred to, are fully described and shown in the aforesaid patent application, now Patent 2,925,753.

Other and further objects, features and advantages of the invention will be pointed out hereinafter and set forth in the appended claims forming part of the application.

In the accompanying drawings, several preferred embodiments of the invention are shown by way of illustration and not by way of limitation.

Figure 1:
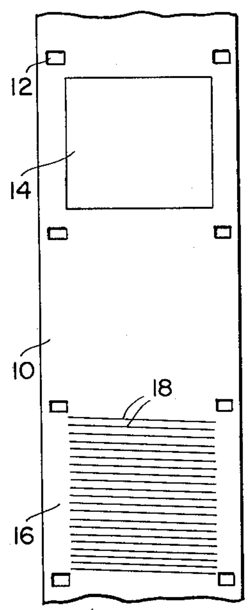
FIG. 1 is a plan view of a strip film bearing a picture area and a linear photographic sound record area, longitudinally spaced from the picture area.

Referring first to FIG. 1 in detail, this figure shows a strip film 10 provided with spaced perforations 12, a picture area 14 and a sound record area 16. The sound record area includes a number of inclined parallel lines 18 representing sound recording, in this case, of a photographic nature. The sound record area 16 is associated with picture area 14 in that the recorded message or intelligence pertains to the picture presented in the picture area. As is apparent, the sound record area is longitudinally spaced from the picture area and each two cooperating areas thus formed on a strip of film constitute a program. Several such programs may be provided on a strip of film as will be more fully explained hereinafter.

Figure 2:
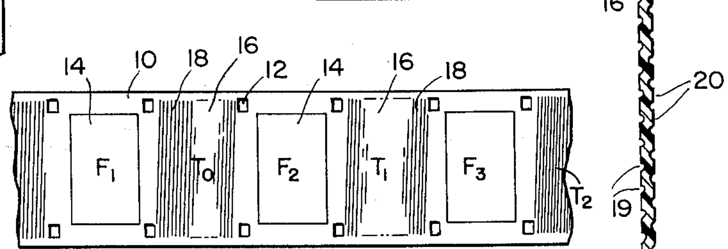
FIG. 2 is a plan view of a modification of the strip film bearing several picture areas and sound record areas.

In order to provide adequate or even ample working space between the projection aperture of the apparatus and the location of a sound pick-up head and more efficiently to utilize the film area, it is sometimes advantageous to stagger the picture frames and the sound track areas as shown in FIG. 2. This figure has interposed between a picture area $F_1$ and the associated sound track $T_1$ another picture area $F_2$ and a sound record area $T_0$ associated with a picture area not shown in FIG. 2. Similarly, a picture area $F_3$ is interposed between the sound track area $T_1$ and the sound record area $T_2$ associated with picture area $F_2$.

Figure 3:
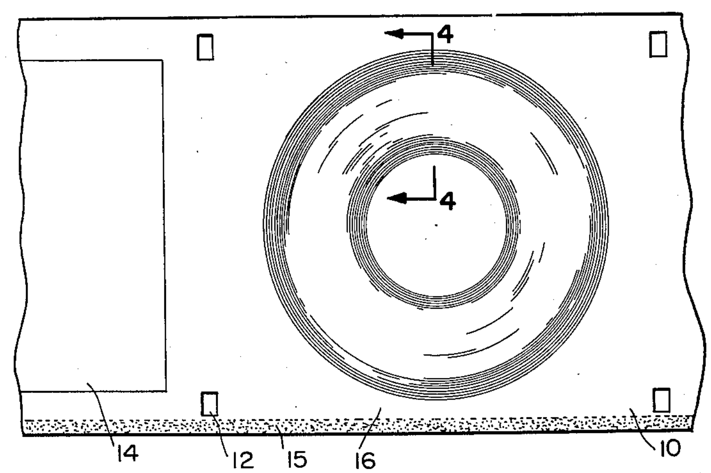
FIG. 3 is a plan view of still another strip film using a mechanical sound track.
Figure 4:
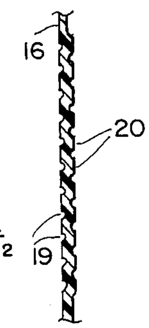
FIG. 4 is a section taken on line 4—4 of FIG. 3 on an enlarged scale.

FIG. 3 shows a strip 10 which in addition to picture areas 14 and sound record areas 16 has along one of its margins a sound track 15 for the purpose of identifying and/or selecting the programs to be shown. The sound record area representing the recorded message to be reproduced comprises a sound track 19 of the mechanically embossed type. A sound track of this kind may be produced by forcing a heated master die into the film base to form lateral sound grooves. As a result, the opposite side of the film may have raised ridges as shown at 20 in FIG. 4.

Figure 5:
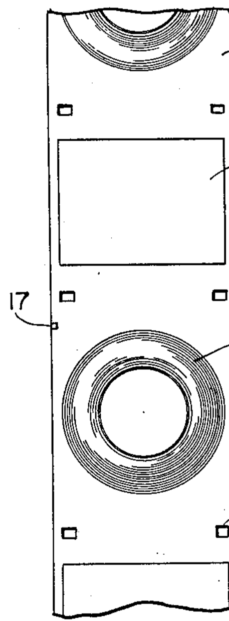
FIG. 5 is a plan view of another modification of a strip film, the film utilizing a spiral photographic film track.

The strip film of FIG. 5 is similar in principle to the previously described arrangements except that its sound record 16 is in the form of a spiral photographic recording of the variable slit or variable width type.

Figure 6:
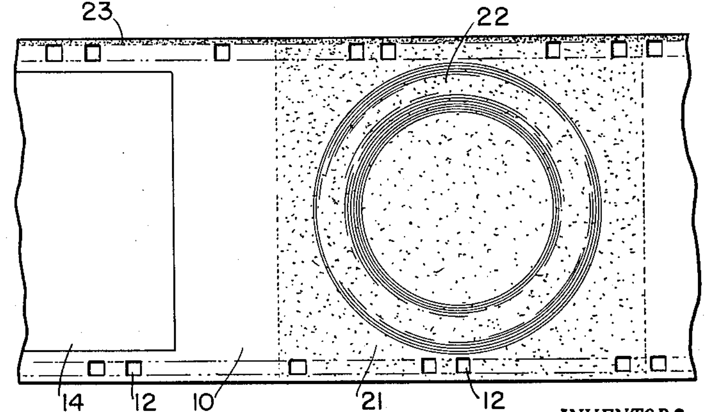
FIG. 6 is a plan view of still another strip film, the film utilizing a spiral magnetic sound track.

FIG. 6 shows a film having perforations 12, a picture area 14 and a sound record area 21. The sound record area is coated with magnetic recording material on which a magnetic spiral sound track 22 has been recorded. An additional magnetic stripe 23 is provided along one edge for the purpose of producing sequencing signals in the event selection among the programs on the film is desired.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A strip of film for projection and reproduction therefrom while the film is stationary, said film having thereon a picture area and a sound record area in longitudinally spaced relationship, the sound track of said sound record area being in the form of a plurality of separate rectilinear and parallel photographic track sections, the recording being continued from the end of one track section to the beginning of the next adjacent track section, said track sections being inclined in reference to a common rectilinear reference line, whereby said track sections when brought to a cylindrical configuration transverse of the length thereof constitute parts of a continuous helical line.

2. A strip of film for projection and reproduction therefrom while the film is stationary, said film having thereon a picture area and a sound record area, the sound track of said sound record area being in the form of a plurality of separate rectilinear and parallel photographic track sections, the recording being continued from the end of one track section to the beginning of the next adjacent track section, said track sections being inclined in reference to a common rectilinear reference line, whereby said track sections when brought to a cylindrical configuration transverse of the length thereof constitute parts of a continuous helical line.

3. A strip of film according to claim 1, wherein several alternately disposed and uniformly spaced picture areas and sound record areas are formed on the film, each one of the picture areas being associated with one of the sound record areas, each of the pairs thus formed constituting a program.

4. A strip of film according to claim 3, wherein an associated picture area and sound record area forming one program are separated from each other by areas forming parts of another program, the two associated areas of each of the programs being disposed on the strip of film at equal longitudinal distances.

5. A strip of film for projection and reproduction therefrom while the film is stationary, said film having thereon a picture area and a sound record area in longitudinally spaced relationship, the sound track of said sound record area being in the form of a plurality of separate rectilinear and parallel magnetically conductive track sections, the recording being continued from the end of one track section to the beginning of the next adjacent track section, said track sections being inclined in reference to a common rectilinear reference line, whereby said track sections when brought to a cylindrical configuration transverse of the length thereof constitute parts of a continuous helical line.

References Cited in the file of this patent

UNITED STATES PATENTS

| | | |
|---|---|---|
| 1,704,124 | Fiedler | Mar. 5, 1929 |
| 2,005,914 | Freund | June 25, 1935 |
| 2,106,245 | Finch | Jan. 25, 1938 |
| 2,215,502 | Harper | Sept. 24, 1940 |
| 2,486,661 | Leitner | Nov. 1, 1949 |
| 2,820,907 | Silverman | Jan 21, 1958 |
| 2,938,731 | Meyer | May 31, 1960 |

FOREIGN PATENTS

| | | |
|---|---|---|
| 337,151 | Great Britain | Oct. 30, 1930 |
| 569,103 | Germany | Jan. 28, 1933 |